Nov. 30, 1965 R. DALLY 3,220,737
ATTACHMENT OF A NEEDLE-CARRYING MEMBER IN A
PHONOGRAPH STYLUS ASSEMBLY
Original Filed July 23, 1962

INVENTOR:
ROY DALLY,

BY Norman C. Fulmer
HIS ATTORNEY.

3,220,737
Patented Nov. 30, 1965

3,220,737

ATTACHMENT OF A NEEDLE-CARRYING MEMBER IN A PHONOGRAPH STYLUS ASSEMBLY

Roy Dally, Warrensburg, Ill., assignor to General Electric Company, a corporation of New York Continuation of application Ser. No. 211,793, July 23, 1962. This application Apr. 19, 1965, Ser. No. 452,443
3 Claims. (Cl. 274—37)

The present invention is a continuation of my copending application Serial No. 211,793, filed July 23, 1962, now abandoned, for Mounting for the Needle-Carrying Member of a Phonograph Stylus Assembly.

This invention relates to phongraph stylus assemblies, and particularly to an improved arrangement for mounting or attaching a needle-carrying member thereof, such as an armature. The invention is an improvement in the stylus assembly structure disclosed and claimed in U.S. Patent No. 3,062,925, issued November 6, 1962, and assigned to the same assignee as is the present patent invention.

The type of stylus assembly structure to which the invention relates comprises a needle-carrying member that is supported by one or more resilient mounting blocks which are carried by a body member. The mounting blocks, and the way they are attached to the body member, have a great effect on performance characteristics of the stylus assembly such as compliance, frequency response, and channel separation if used for playing stereo records.

An object of the invention is to provide an improved phonograph stylus assembly.

Another object is to provide a stylus assembly structure which is relatively easy to manufacture.

A further object is to provide a stylus assembly structure which insures uniformity among manufactured stylus assemblies.

A still further object is to provide an improved stylus assembly which achieves better and more uniform performance characteristics.

Another object is to provide an improved method and structure for attaching a mounting block to the body member of a stylus assembly.

Still other objects will be apparent from the following description and claims, and from the drawing in which:

Figure 1:
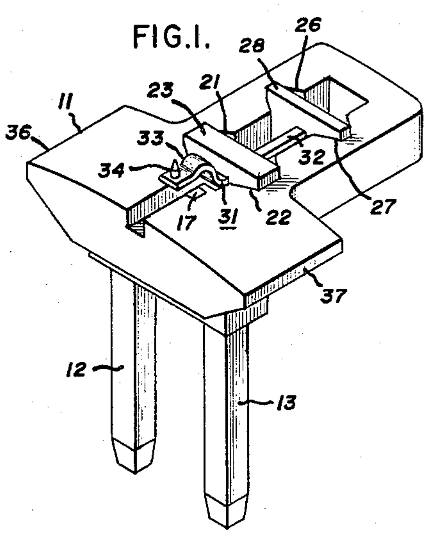
FIG. 1 is a perspective view of a stylus assembly in accordance with a preferred embodiment of the invention, looking generally toward the bottom or stylus-carrying part thereof.
Figure 2:
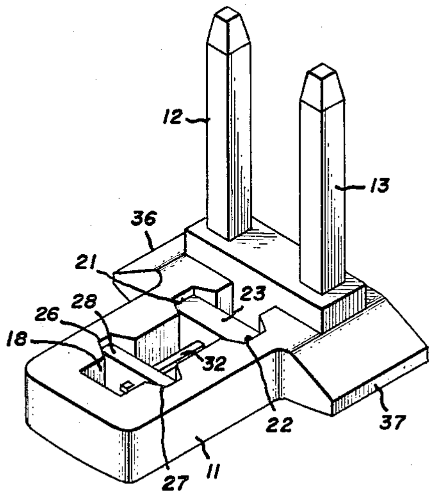
FIG. 2 is a perspective view of the preferred embodiment of the invention, looking generally toward the top thereof.

The invention comprises, basically and in its preferred embodiment, a body member provided with an elongated slot therein. One or more pairs of notches are provided in the sides of the slot, each pair of notches being laterally disposed with respect to the slot, and each of these notches being tapered so as to be relatively widest at the main surface of the slot. Mounting blocks are respectively positioned in the pairs of notches, so as to extend across the slot in the body member. A needle-carrying elongated member extends through openings in the mounting blocks so as to be held by the damping blocks. The objects of the invention are achieved by the aforesaid taper of the notches.

Now referring to the drawings, the preferred embodiment of the stylus assembly comprises a body member 11 preferably made from electrically insulative material such as plastic. A pair of magnetic cores 12 and 13 are carried by the body member 11, and extend therefrom in a mutually parallel relationship and are adapted to be inserted into coils of a pickup cartridge as is described in the aforementioned U.S. Patent No. 3,062,925. Within the body member 11, the cores 12 and 13 curve toward each other, the inner ends thereof providing pole pieces 16 and 17 spaced apart to provide a gap therebetween.

Figure 3:
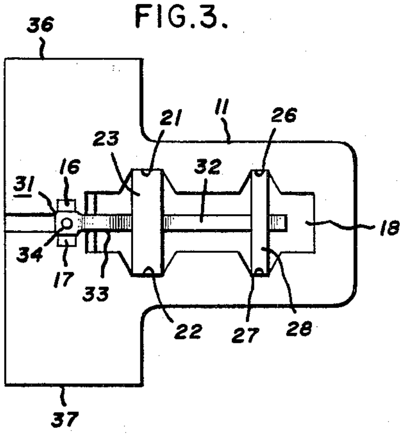
FIG. 3 is a bottom view of the preferred embodiment of the invention.

An elongated slot 18 is provided in the body member 11 behind and in alignment with the pair of pole pieces 16, 17 (as shown in FIG. 3). A first pair of notches 21, 22 are laterally disposed in the sides of the slot 18, and a first mounting block 23 of resilient material is positioned in the notches 21, 22 and extends across the slot 18. A second pair of notches 26, 27 are laterally disposed in the sides of the slot 18, and a second mounting block 28 of resilient material is positioned in these notches and extends across the slot 18. Preferably the blocks 23 and 28 are made from butyl rubber or natural gum rubber; and one block may be of one of these materials and the other block may be of other material.

Each of the notches 21, 22, 26, and 27 is tapered, as shown, so as to be narrowest at the deepest or bottom part thereof, and widest at the main surface of the slot 18. The breadth of the bottoms of these notches is approximately the same as the thickness of the mounting blocks thereat, so that the notches provide proper longitudinal positioning of the mounting blocks 23, 28 in the slot 18, and at the same time the outside corners of these notches, at the surface of the slot 18, are spaced from, and free from engagement with, the mounting blocks. The mounting blocks 23, 28 may be secured to the body member 11 by means of cement or adhesive at the opposite sides of the blocks where they engage the bottoms of the notches.

An elongated member 31, which may be an armature made from magnetically conductive material and crank-shaped as shown, has an elongated arm portion 32 extending through openings in the mounting blocks 23 and 28. The armature 31 further has a crank portion 33 extending below the gap between the pole pieces 16, 17 as shown. A needle or stylus 34, adapted for engaging the groove of a phonograph record, is attached to and extends laterally outwardly from the crank portion 33 of the armature 31.

The body member 11 extends laterally outwardly at opposite sides thereof to provide finger-gripping portions 36 and 37 to facilitate manual gripping of the stylus assembly for insertion into and removal from a pickup cartridge.

In accordance with the present invention, the stylus assembly is considerably improved by the tapering of the notches 21, 22, 26 and 27. The manufacturing of the stylus assembly is improved, because it is easier and quicker to insert the mounting blocks 23, 28 into the tapered notches per the invention, than to insert them into notches having parallel sides as shown in the aforesaid U.S. Patent No. 3,062,925. Performance of the stylus assemblies is more uniform and of better quality, because the entire lateral widths of the mounting blocks are free from engagement with the body member 11, thereby providing more uniform and greater resilient action thereof to permit the member 31 to vibrate properly when the needle 34 engages the groove of a rotating phonograph record. Also, due to the tapered notches of the invention, there is no squeezing action of the sides of the notches against the surfaces of the mounting blocks. As is inherent with any manufactured article, the mounting blocks vary slightly in thickness, and hence notches having parallel sides would cause a greater squeezing effect on the relatively thicker blocks than on the relatively thinner blocks, thereby creating non-uniformity of performance characteristics among the manufactured stylus assemblies.

For the aforesaid reasons, the invention provides for easier manufacture, and better and more uniform performance characteristics, of the stylus assemblies.

Although shown and described as applied to a magnetic type of stylus assembly, the invention is not limited to this type of stylus assembly.

While a preferred embodiment of the invention has been shown and described, other embodiments and modifications thereof will be apparent to those skilled in the art, and will fall within the scope of invention as defined in the following claims.

What I claim is:

1. A stylus assembly comprising a body member with a slot therein, said slot including a pair of mutually facing sides, a pair of substantially parallel notches respectively located in the sides of said slot, each of said notches having an innermost surface and a pair of tapered side walls connected to said innermost surface at associated corners, said side walls of each notch extending divergently from said innermost surface and being spaced apart maximally at the surface of its associated side of said slot, a resilient mounting block positioned in said notches and extending across said slot, said block including a pair of corners in contiguous relationship with associated corners of each of said notches, said block being dimensioned relative to said notches so that it engages the innermost surface of each notch but does not engage the tapered side walls of the notches, and a needle-carrying member held by said mounting block, whereby the positioning of said block in the notches of said body provides uniform resilient action of said block while at the same time enhancing the manufacturability of said stylus assembly.

2. A stylus assembly comprising a body member with an elongated slot therein, said slot including a pair of mutually facing sides, a first pair of substantially parallel notches respectively located in the sides of said slot, a second pair of substantially parallel notches respectively located in the sides of said slot and spaced from said first pair of notches along the axis of said slot, each of said notches having an innermost surface and a pair of tapered side walls connected to said innermost surface at associated corners, said side walls of each notch extending divergently from said innermost surface and being spaced apart maximally at the surface of its associated side of said slot, first and second resilient mounting blocks respectively positioned in said first and second pairs of notches and each extending across said slot, said blocks each including a pair of corners in contiguous relationship with associated corners of each of said notches, said blocks being each dimensioned relative to its associated pair of said notches so that it engages the innermost surface of each notch but does not engage the tapered side walls of the notches, and a needle-carrying member held by said first and second mounting blocks, whereby the positioning of said first and second blocks in the notches of said body provides uniform resilient action of said blocks while at the same time enhancing the manufacturability of said stylus assembly.

3. A stylus assembly comprising a body member with a slot therein, said slot including a pair of mutually facing sides, a pair of substantially parallel notches respectively located in the sides of said slot, each of said notches having an innermost flat surface and a pair of uniformly tapered side walls connected to said innermost surface at associated corners, said tapered side walls extending divergently from said innermost surface, said side walls of each notch being spaced apart maximally at the surface of its associated side of said slot, a resilient mounting block positioned in said notches and extending across said slot, said block including a pair of corners in contiguous relationship with associated corners of each of said notches, said block being dimensioned relative to said notches so that it engages the innermost surface of each notch but does not engage the tapered side walls of the notches, and a needle-carrying member extending through and held by said mounting block, whereby the positioning of said block in the notches of said body provides a uniform resilient action of said block while at the same time enhancing the manufacturability of said stylus assembly.

References Cited by the Examiner

UNITED STATES PATENTS 3,062,925 11/1962 Pritchard ------------ 274—37

NORTON ANSHER, *Primary Examiner.*